(12) United States Patent
Nanri

(10) Patent No.: US 9,209,952 B2
(45) Date of Patent: Dec. 8, 2015

(54) SERVER DEVICE, BASE STATION DEVICE, AND IDENTIFICATION NUMBER ESTABLISHMENT METHOD

(71) Applicant: PANASONIC INTELLECTUAL PROPERTY MANAGEMENT CO., LTD., Osaka (JP)

(72) Inventor: Masahiko Nanri, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 69 days.

(21) Appl. No.: 14/360,476

(22) PCT Filed: Dec. 26, 2012

(86) PCT No.: PCT/JP2012/008335
§ 371 (c)(1),
(2) Date: May 23, 2014

(87) PCT Pub. No.: WO2013/099247
PCT Pub. Date: Jul. 4, 2013

(65) Prior Publication Data
US 2014/0301347 A1    Oct. 9, 2014

(30) Foreign Application Priority Data

Dec. 27, 2011   (JP) ................................ 2011-285667

(51) Int. Cl.
*H04L 12/26* (2006.01)
*H04W 4/00* (2009.01)
(Continued)

(52) U.S. Cl.
CPC ............. *H04L 5/005* (2013.01); *H04J 11/0069* (2013.01); *H04L 5/0033* (2013.01); *H04W 24/02* (2013.01)

(58) Field of Classification Search
CPC .............. H04W 24/02; H04W 28/048; H04W 36/0055; H04W 36/0061; H04W 36/0083; H04W 36/10; H04W 36/20; H04W 52/244; H04W 72/04206; H04W 72/0446; H04W 72/0453; H04W 72/082; H04W 76/00; H04W 76/002; H04W 76/02; H04W 76/021; H04W 76/022; H04W 76/025; H04L 5/0005; H04L 5/0032; H04L 5/0033; H04L 5/0035; H04L 5/005; H04L 5/0073; H04L 27/261; H04L 2025/03783; H04J 11/005; H04J 11/00; H04J 11/23; H04J 11/0053; H04J 11/0056; H04J 11/0069; H04J 11/0079; H04J 2011/0096
USPC .............. 370/236.2, 252, 310–350, 431–444, 370/464–465, 479–482, 498; 455/418–466
See application file for complete search history.

(56) References Cited

U.S. PATENT DOCUMENTS

| 8,687,581 B2 * | 4/2014 | Kim | .................... H04J 11/0069 370/329 |
| 8,817,754 B2 * | 8/2014 | Ko | ....................... H04B 7/0413 370/335 |

(Continued)

FOREIGN PATENT DOCUMENTS

| JP | 2011-504352 | 2/2011 |
| JP | 2011-130354 | 6/2011 |
| WO | 2010/081855 | 7/2010 |

OTHER PUBLICATIONS

3GPP TS 36.211 V10.3.0 "3$^{rd}$ Generation Partnership Project; Technical Specification Group Radio Access Network; Evolved Universal Terrestrial Radio Access (E-UTRA); Physical Channels and Modulation (Release 10)," 3GPP Organizational Partners, Valbonne, France, Sep. 2011, pp. 1-103.

(Continued)

*Primary Examiner* — Tri H Phan
(74) *Attorney, Agent, or Firm* — Dickinson Wright PLLC

(57) ABSTRACT

Provided are a server device, a base station device, and an identification number establishment method, with which it is possible to avoid CRS interference between neighboring base stations, to improve downstream throughput, and to prevent a UE from erroneous cell selection. When a location information receiving unit (101) of an OAM (100) receives location information of a new eNB, a resource index establishment unit (104) selects a resource index (vshift) other than a resource index (vshift) which is used in an eNB which is neighboring to the new eNB. A cell ID computation unit (105) computes a cell ID from the selected resource index (vshift), and the computed cell ID is transmitted from a cell ID transmission unit (106) to the new eNB.

9 Claims, 15 Drawing Sheets

(51) Int. Cl.
*H04J 4/00* (2006.01)
*H04W 72/00* (2009.01)
*H04L 5/00* (2006.01)
*H04W 24/02* (2009.01)
*H04J 11/00* (2006.01)

(56) References Cited

U.S. PATENT DOCUMENTS

| | | | | |
|---|---|---|---|---|
| 8,838,090 | B2* | 9/2014 | Gunnarsson | H04W 24/02 455/415 |
| 8,965,294 | B2* | 2/2015 | Seo | H04J 11/005 455/437 |
| 9,014,155 | B2* | 4/2015 | Gupta | H04W 8/26 370/338 |
| 2009/0092122 | A1 | 4/2009 | Czaja | |
| 2009/0129291 | A1 | 5/2009 | Gupta | |
| 2009/0129354 | A1 | 5/2009 | Gupta | |
| 2010/0178912 | A1 | 7/2010 | Gunnarsson | |
| 2011/0223920 | A1 | 9/2011 | Wang | |
| 2012/0329400 | A1 | 12/2012 | Seo | |
| 2013/0344909 | A1* | 12/2013 | Davydov | H04B 7/0689 455/501 |
| 2014/0056274 | A1* | 2/2014 | Yu | H04L 5/0007 370/330 |
| 2014/0254539 | A1* | 9/2014 | Nagata | H04L 5/0048 370/329 |
| 2015/0195057 | A1* | 7/2015 | Tan | H04J 11/005 370/252 |

OTHER PUBLICATIONS

International Search Report dated May 2, 2013.
Extended European Search Report dated May 29, 2015.

* cited by examiner

FIG. 6A

| RESOURCE INDEX | 0 | 1 | 2 | 3 | 4 | 5 |
|---|---|---|---|---|---|---|
| DISTANCE [m] | | | | | | |

FIG. 6B

| RESOURCE INDEX | 0 | 1 | 2 | 3 | 4 | 5 |
|---|---|---|---|---|---|---|
| DISTANCE [m] | 320 | | 374 | | | |

FIG. 6C

| RESOURCE INDEX | 0 | 1 | 2 | 3 | 4 | 5 |
|---|---|---|---|---|---|---|
| DISTANCE [m] | 320 | 489 | 374 | 401 | 455 | 367 |

FIG. 10A

| RESOURCE INDEX | 0 | 1 | 2 | 3 | 4 | 5 |
|---|---|---|---|---|---|---|
| RECEPTION LEVEL [dBm] | | | | | | |

FIG. 10B

| RESOURCE INDEX | 0 | 1 | 2 | 3 | 4 | 5 |
|---|---|---|---|---|---|---|
| RECEPTION LEVEL [dBm] | −95 | | −102 | | | |

FIG. 10C

| RESOURCE INDEX | 0 | 1 | 2 | 3 | 4 | 5 |
|---|---|---|---|---|---|---|
| RECEPTION LEVEL [dBm] | −95 | −90 | −102 | −108 | −89 | −101 |

| RESOURCE INDEX | 0 | 1 | 2 | 3 | 4 | 5 |
|---|---|---|---|---|---|---|
| DISTANCE [m] | | | | | | |

FIG. 14A

| RESOURCE INDEX | 0 | 1 | 2 | 3 | 4 | 5 |
|---|---|---|---|---|---|---|
| DISTANCE [m] | 320 | | 374 | 320 | | 374 |

FIG. 14B

| RESOURCE INDEX | 0 | 1 | 2 | 3 | 4 | 5 |
|---|---|---|---|---|---|---|
| DISTANCE [m] | 320 | 489 | 374 | 320 | 489 | 374 |

FIG. 14C

SERVER DEVICE, BASE STATION DEVICE, AND IDENTIFICATION NUMBER ESTABLISHMENT METHOD

TECHNICAL FIELD

The present invention relates to a server apparatus, a base station apparatus, and an identification number determining method for automatically optimizing an identification number of a newly installed base station apparatus by taking into account a frequency assignment for reference signals of a neighboring base station apparatus.

BACKGROUND ART

The worldwide introduction of LIE (Long Term Evolution), which is a next-generation mobile communication standard, has already started. Adopting OFDM (Orthogonal Frequency Division Multiplexing) and MIMO (Multiple-Input Multiple-Output) techniques or the like for downlink and SC-FDMA (Single Carrier-Frequency Division Multiple Access) or the like for uplink has enabled LTE to achieve drastic throughput improvement and also to flexibly assign physical channels to time and frequency domain radio resources.

Furthermore, studies have been carried out on an SON (Self Organizing Network) to simplify installation and operation of base stations in recent years. Applying the SON enables automatic optimization of parameters (e.g., cell ID, channel bandwidth, and transmission power) of each base station without a prior field survey or radio zone design that is normally performed by a communication carrier, thus leading to a reduction in the installation and operation costs of base stations.

PTL 1 discloses a means for setting the cell ID of a newly installed base station in such a way that the cell ID not to overlap with the cell ID of a neighboring base station, as an example of SON. More specifically, PTL 1 discloses a means for the newly installed base station to directly acquire a cell ID from the neighboring base station via an X2 interface, a means for acquiring a cell ID on the basis of a radio signal transmitted from the neighboring base station, a means for acquiring a cell ID via a terminal apparatus and a means for directly acquiring a cell ID from a network node that manages cell IDs of base stations, for example. The newly installed base station using one of these means acquires the cell IDs of the neighboring base stations and assigns any cell ID that does not overlap with those cell IDs as the cell ID of the base station.

In the LTE system mentioned above, a cell ID is an important parameter that determines not only the identification number of the cell but also the sequence (hereinafter referred to as "CRS sequence") that forms a downlink reference signal (hereinafter referred to as "CRS: Cell-specific Reference Signal"), and a frequency resource assignment. The details of the method of generating a CRS sequence and resource allocation method are disclosed in NPL 1, and an overview thereof will be described herein.

First, CRS sequence $r_{l,n_s}(m)$ is expressed by following equation 1.

(Equation 1)

$$r_{l,n_s}(m) = \frac{1}{\sqrt{2}}(1-2\cdot c(2m)) + j\frac{1}{\sqrt{2}}(1-2\cdot c(2m+1)), \quad [1]$$
$$m = 0, 1, \ldots, 2N_{RB}^{max,DL}-1$$

In equation 1, $n_s$ denotes a slot number, l denotes an OFDM symbol number in a slot, and c denotes a pseudonoise sequence. Here, pseudonoise sequence c is defined by a shift register having a sequence length of 31 and expressed by the following equation using variable n.

[2]

$$c(n)=(x_1(n+N_C)+x_2(n+N_C)) \bmod 2 \quad \text{(Equation 2)}$$

[3]

$$x_1(n+31)=(x_1(n+3)+x_1(n)) \bmod 2 \quad \text{(Equation 3)}$$

[4]

$$x_2(n+31)=(x_2(n+3)+x_2(n+2)+x_2(n+1)+x_2(n)) \bmod 2 \quad \text{(Equation 4)}$$

Here, Nc=1600. The shift register expressed by equation 3 is initialized by following equation 5 for each OFDM symbol.

[5]

$$x_1(0)=,x_1(n)=0, n=1,2,\ldots,30 \quad \text{(Equation 5)}$$

Similarly, the shift register expressed by equation 4 is initialized with a value resulting from converting the value of a decimal number into a binary number, the value of a decimal number being obtained by equation 6 below for each OFDM symbol.

[6]

$$c_{init}=2^{10}\cdot(7\cdot((n_s+1)+l+1)\cdot(2\cdot N_{ID}^{cell}+1)+2\cdot N_{ID}^{cell}+N_{CP} \quad \text{(Equation 6)}$$

Here, $N_{ID}^{cell}$ denotes a cell ID, which can take a value of 0 to 503. $N_{CP}$ denotes a CP (Cyclic Prefix) length and "1" is inputted thereto for a normal CP and "0" is inputted thereto for an extended CP.

Although it may depend on the operation policy of the communication carrier, an extended CP is applied for the purpose of providing coverage for a region with an extremely low population density by using a single base station on a large scale. For this reason, a base station using an extended CP and a base station using a normal CP are hardly used in mixture, whereas a common CP length is often selected for each region. In such a case, the CRS sequence is uniquely determined by a cell ID.

As an example, FIG. 1 shows a normalized cross-correlation of a CRS sequence with cell ID=100 and CRS sequences with other cell IDs under a condition of channel bandwidth 5 MHz, normal CP, $n_s=0$, $l=0$ (that is, subframe leading CRS). Thus, the CRS sequences are not orthogonal to each other and generally have a cross-correlation on the order of 0.1 to 0.3.

Next, a CRS resource assignment method will be described. FIGS. 2A to 2C shows an example of a CRS resource assignment in one resource block in one subframe, which is a transmission unit of LTE. In FIGS. 2A to 2C, the horizontal axis shows the time domain and the width of one grid on the horizontal axis represents the time length of one OFDM symbol. The vertical axis shows the frequency domain and the width of one grid on the vertical axis represents one subcarrier. Each shaded block indicates the assignment position of a CRS.

CRS resource assignment in the time direction is uniquely determined by the presence or absence of MIMO transmission of the base station and a CP length. FIG. 2 shows an example of a case with no MIMO transmission and with a normal CP. In this case, CRSs are assigned in the first, fifth, eighth and twelfth OFDM symbols.

Regarding the frequency direction, CRSs are assigned every six subcarriers and their positions are determined by a parameter called resources index $v_{shift}$. That is, resource index $v_{shift}$ shows the frequency assignment for CRSs transmitted by the base station. Resource $v_{shift}$ takes an integer of 0 to 5 and is calculated based on cell ID as shown in following equation 7.

[7]
$$v_{shift} = N_{ID}^{cell} \bmod 6 \quad \text{(Equation 7)}$$

FIG. 2A shows a CRS assignment when $v_{shift}=0$. CRSs are assigned in a cyclically shifted manner in the frequency direction by $v_{shift}$ using the assignment of $v_{shift}=0$ shown in FIG. 2A as a reference. That is, FIG. 2B and FIG. 2C show assignments when $v_{shift}=2$ and when $v_{shift}=4$, respectively.

CITATION LIST

Patent Literature

PTL 1
Japanese Unexamined Patent Application Publication (Translation of PCT Application) No. 2011-504352

Non-Patent Literature

NPL 1
3GPP TS 36.211 V10.3.0 "3rd Generation Partnership Project; Technical Specification Group Radio Access Network; Evolved Universal Terrestrial Radio Access (E-UTRA); Physical Channels and Modulation (Release 10)"

SUMMARY OF INVENTION

Technical Problem

The technique disclosed in PTL 1 makes it possible to avoid a cell ID from overlapping with that of a neighboring base station, but has a problem in that CRS resources overlap with each other when the values of $v_{shift}$'s are the same value between neighboring cells.

As described above, the sequences used for CRSs are not orthogonal sequences, so that, when resources overlap with each other, cross interference occurs. The cross interference causes various influences such as deterioration of downlink throughput, deterioration of channel quality measurement accuracy or the like as a result.

FIG. 3 shows an example where overlapping $v_{shift}$ occurs. An assumption is made that a mobile station (hereinafter referred to as "UE; User Equipment") exists within the coverage area of base station (hereinafter referred to as "eNB") #1 (cell ID=434). However, resource indices $v_{shift1}$ and $v_{shift2}$ of eNB#1 and neighboring eNB#2 (cell ID=230) are as shown below according to equation 7 respectively.

[8]
$$v_{shift1} = 434 \bmod 6 = 2 \quad \text{(Equation 8)}$$

[9]
$$v_{shift2} = 230 \bmod 6 = 2 \quad \text{(Equation 9)}$$

That is, CRS resources of eNB#1 and eNB#2 are both allocated as shown in FIG. 2B. Therefore, CRSs of eNB#2 cause interference to CRSs of eNB#1, and channel estimation accuracy of the UE deteriorates, resulting in reduced downlink throughput in the UE.

Moreover, when eNB#3 (cell ID=72, $v_{shift3}=0$ in this case) is a neighboring base station, CRSs transmitted from eNB#3 reach the UE without receiving any interference from other base stations. As a result, the UE may perform handover to eNB#3 although the UE is located within the coverage area of eNB#1.

An object of the present invention is to provide a server apparatus, a base station apparatus and an identification number determining method that avoid CRSs from interfering with each other among neighboring base stations, that improve downlink throughput and that prevent erroneous cell selection by a UE.

Solution to Problem

A server apparatus according to an aspect of the present invention is a sever apparatus that manages an identification number of a base station, the server apparatus including: a determining section that determines, based on an identification number of a neighboring base station around a newly installed new base station, a frequency assignment for reference signals different from a frequency assignment for reference signals transmitted by the neighboring base station; an identification number calculation section that calculates an identification number of the new base station based on the determined frequency assignment; and a transmitting section that transmits the calculated identification number to the new base station.

A base station apparatus according to an aspect of the present invention includes: a receiving section that receives from a neighboring base station an identification number of the neighboring base station; a determining section that determines a frequency assignment for reference signals different from a frequency assignment for reference signals transmitted by the neighboring base station, based on the identification number of the neighboring base station; and an identification number calculation section that calculates an identification number of the base station based on the determined frequency assignment.

An identification number determining method according to an aspect of the present invention is a method for a server apparatus that manages an identification number of a base station, the method including: determining, based on an identification number of a neighboring base station around a newly installed new base station, a frequency assignment for reference signals different from a frequency assignment for reference signals transmitted by the neighboring base station; calculating an identification number of the new base station based on the determined frequency assignment; and transmitting the calculated identification number to the new base station.

An identification number determining method according to an aspect of the present invention is a method for a newly installed new base station to determine an identification number that identifies the new base station, the method including: receiving from a neighboring base station an identification number of the neighboring base station; determining a frequency assignment for reference signals different from a frequency assignment for reference signals transmitted by the neighboring base station, based on the identification number of the neighboring base station; and calculating an identification number of the new base station based on the determined frequency assignment.

Advantageous Effects of Invention

According to the present invention, it is possible to avoid overlapping of resource indices among neighboring base stations, thereby avoiding CRSs from interfering with each other among the neighboring base stations, and enabling an improvement in downlink throughput and prevention of erroneous cell selection by a UE.

BRIEF DESCRIPTION OF DRAWINGS

FIGS. 6A, 6B and 6C illustrate a resource index list according to Embodiment 1 of the present invention;

FIGS. 10A, 10B, and 10C illustrate a resource index list according to Embodiment 2 of the present invention;

FIGS. 14A, 14B, and 14C illustrate a resource index list according to Embodiment 3 of the present invention.

DESCRIPTION OF EMBODIMENTS

Hereinafter, embodiments of the present invention will be described in detail with reference to the accompanying drawings.

Embodiment 1

Figure 4:
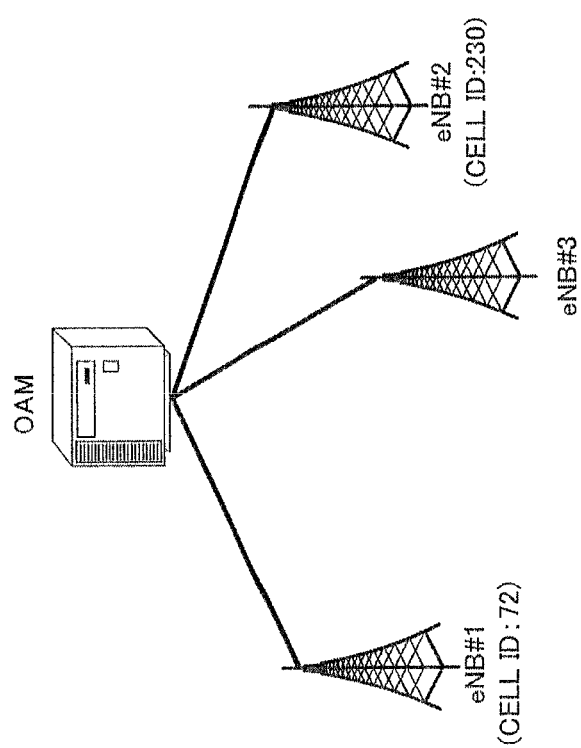
FIG. 4 illustrates a network system configuration according to Embodiment 1 of the present invention.

FIG. 4 illustrates a network system configuration according to Embodiment 1 of the present invention. FIG. 4 illustrates a situation where, while eNB#1, eNB#2 and these parameters are under the management of an OAM (Operations, Administration and Maintenance), eNB#3 is newly installed.

Figure 5:
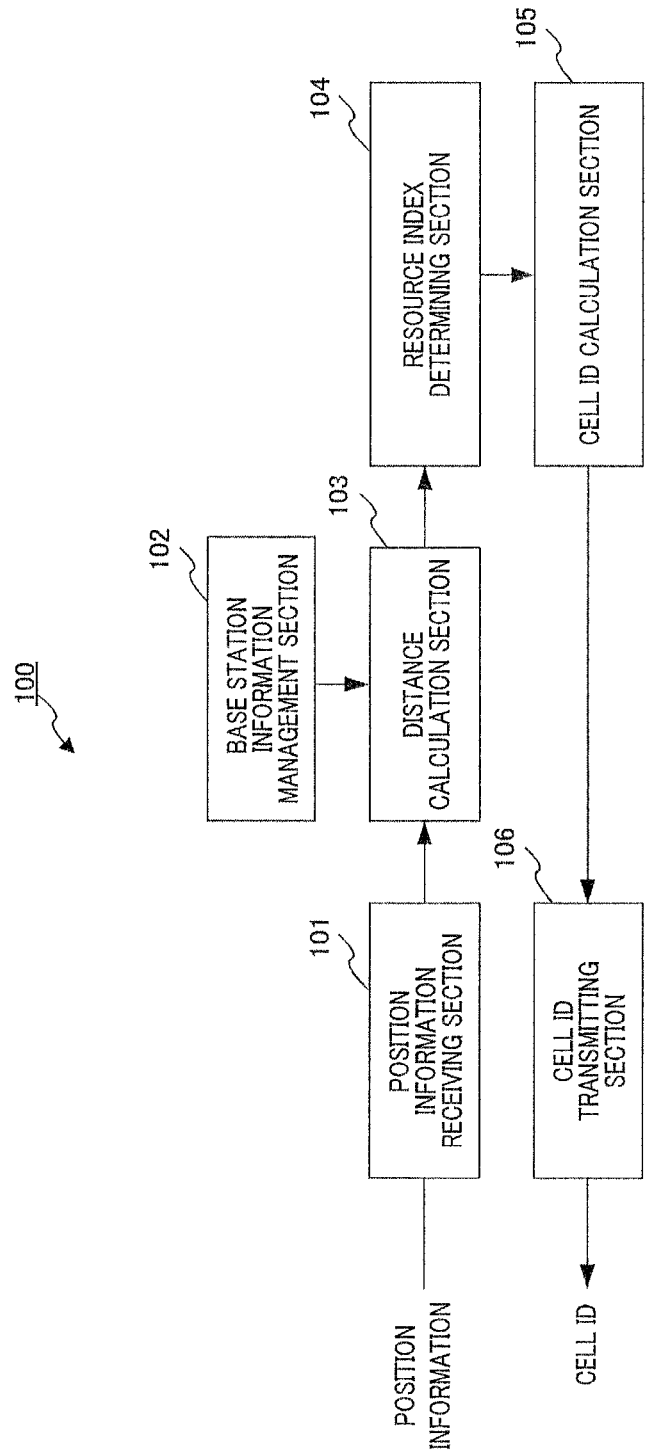
FIG. 5 is a block diagram illustrating a configuration of an OAM according to Embodiment 1 of the present invention.

FIG. 5 is a block diagram illustrating a configuration of OAM 100 according to Embodiment 1 of the present invention. In FIG. 5, position information receiving section 101 receives position information (e.g., latitude and longitude) indicating an installation position of the new eNB from the newly installed eNB (hereinafter referred to as "new eNB") and outputs the received position information to distance calculation section 103.

Base station information management section 102 manages the position information and cell IDs of eNBs under the control of OAM 100.

Distance calculation section 103 acquires position information and cell IDs of all eNBs under the control of the OAM from base station information management section 102 and acquires the position information of the new eNB from position information receiving section 101. Distance calculation section 103 calculates distances between the new eNB and other eNBs using the acquired information. More specifically, assuming that the installation position of the new eNB is (P1, R1) and the installation position of an eNB to be measured is (P2, R2) (in units of radian for both), distance D [m] of the two eNBs is calculated by equation 10.

(Equation 10)
$$D = \sqrt{(M(P1-P2))^2 + \left(N(R1-R2)\cos\frac{P1+P2}{2}\right)^2} \quad [10]$$

(Equation 11)
$$M = \frac{6334834}{\sqrt{(1-0.006674(\sin^2((P1+P2)/2)))^3}} \quad [11]$$

(Equation 12)
$$N = \frac{6377397}{\sqrt{1-0.006674(\sin^2((P1+P2)/2))}} \quad [12]$$

In the equations, M denotes a meridian curvature radius and N denotes a prime vertical curvature radius. The distance between the new eNB and each of the other eNBs is calculated from equations 10 to 12. Distance calculation section 103 outputs one or more cell IDs of all eNBs whose calculated distance is equal to or less than a threshold (e.g., 500 [m]) as one or more valid cell IDs to resource index determining section 104 together with the information on the distance from the new eNB. When there is no eNB whose calculated distance is equal to or less than the threshold, distance calculation section 103 outputs an invalid value (Null) to resource index determining section 104.

When a valid cell ID is outputted from distance calculation section 103, resource index determining section 104 first initializes a resource index list for managing use or nonuse of resource index $v_{shift}$ as shown in FIG. 6A. The input of a distance indicates the use of resource index $v_{shift}$, so that resource indices are initialized by resetting (erasing) the distance inputted to the resource index list.

Next, resource index determining section 104 calculates resource index $v_{shift}$ of the each neighboring eNB from the valid cell ID based on equation 7. Next, resource index determining section 104 inputs a distance corresponding to the resource index used in the neighboring eNB to the resource index list (see FIG. 6B) and extracts unused resource indices $v_{shift}$ as resource index candidates. Here, since resource indices $v_{shift}$=0, 2 are used in other neighboring eNBs, {1, 3, 4, 5} are extracted as resource index candidates.

Furthermore, resource index determining section 104 selects an arbitrary resource index $v_{shift}$ from among the resource index candidates and outputs index $v_{shift}$ to cell ID calculation section 105. In this case, let us suppose that resource index $v_{shift3}=4$ is selected in this case. Consider a situation where many eNBs exist around the eNB, all resource indices $v_{shift}$ are thus already used, and there are no resource index candidates as shown in FIG. 6C. In this situation, resource index $v_{shift}$ of an eNB installed at a farthest position from the new eNB (that is, resource index corresponding to the largest distance in the resource index list) is selected ($v_{shift3}=1$ is selected in the example of FIG. 6C). Upon reception of Null from distance calculation section 103, resource index determining section 104 selects any resource index $v_{shift}$.

Cell ID calculation section 105 converts resource index $v_{shift}$ outputted from resource index determining section 104 to an arbitrary cell ID according to equation 13 below and outputs the cell ID to cell ID transmitting section 106. However, when there is no resource index candidate and resource index $v_{shift}$ of the eNB installed at the farthest position from the new eNB is selected, cell ID calculation section 105 calculates a cell ID different from the cell ID of the eNB installed at the farthest position.

(Equation 13)

$$CellId = rand\left(\frac{N_{ID}}{6} - 1\right) \times 6 + v_{shift} \qquad [13]$$

In this equation, an assumption is made that Nm is the number of cell ID candidates (=504), and rand(A) is a function that outputs an arbitrary integer among 0 to A in a uniform distribution.

Cell ID transmitting section 106 indicates the cell ID outputted from cell ID calculation section 105 to the new eNB.

Next, the method of determining the cell ID of a new eNB in OAM 100 shown in FIG. 5 will be described using FIG. 7. Hereinafter, as shown in FIG. 4, a case will be described as an example where, while eNB#1 (cell ID=72, installation position (latitude, longitude)=(35.6785830, 139.7652470)), eNB#2 (cell ID=230, installation position=(35.680622°, 139.770105°)) and OAM managing these parameters are in operation, eNB#3 the (installation position=(35.681382°, 139.766084°)) is newly installed.

Figure 7:
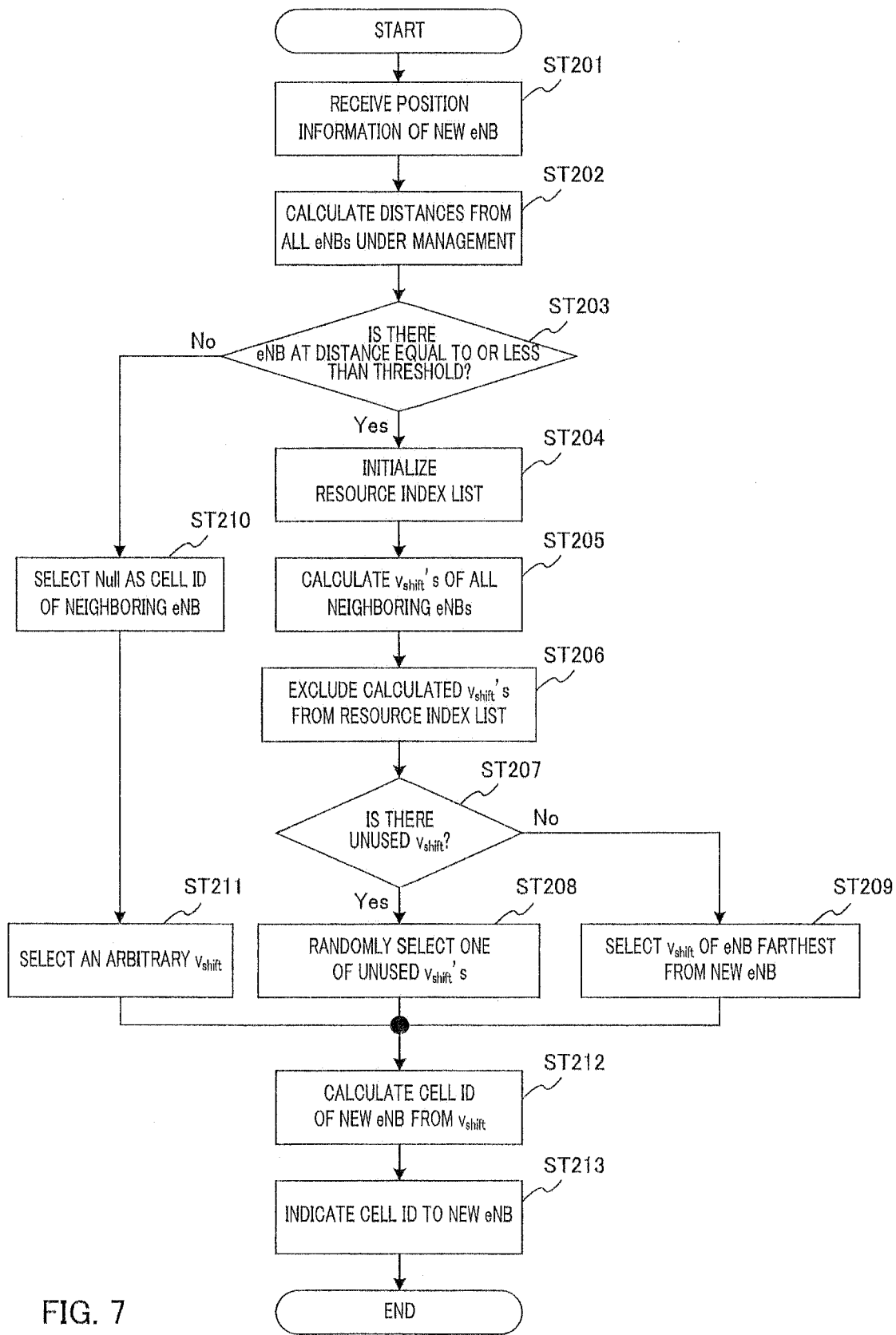
FIG. 7 is a flowchart illustrating a method of determining a cell ID for a new eNB in the OAM shown in FIG. 5.

In FIG. 7, in step (hereinafter abbreviated as "ST") 201, position information receiving section 101 receives position information of newly installed eNB#3 from eNB#3, and in ST202, distance calculation section 103 calculates distance D [m] between new eNB#3 and other eNBs using position information of all eNBs under the control of the OAM and the position information of new eNB#3 according to equation 10. In this example, suppose that the distance between eNB#1 and eNB#3 D1=320 [m], and distance between eNB#2 eNB#3 D2=374 [m] are determined, respectively. Similarly, distance calculation section 103 also calculates distances with respect to eNB#4, eNB#5 (not shown), and so forth.

In ST203, distance calculation section 103 determines the presence or absence of an eNB whose calculated distance is equal to or below a threshold (e.g., 500 [m]), and the operation moves to ST204 when there is an eNB whose calculated distance is equal to or below the threshold, or moves to ST210 when there is no eNB whose calculated distance is equal to or below the threshold In ST204, resource index determining section 104 initializes the resource index list as shown in FIG. 6A, and in ST205, resource index determining section 104 calculates resource index $v_{shift}$ of each neighboring eNB from valid cell IDs based on equation 7. In the case of the example shown in FIG. 4, resource index $v_{shift}$ of eNB#1=0 and resource index $v_{shift2}$ of eNB#2=2 are obtained.

In ST206, resource index determining section 104 inputs, to the resource index list, resource index $v_{shift}$ calculated in ST204, that is, a distance corresponding to resource index $v_{shift}$ used in neighboring eNBs (see FIG. 6B) and extracts unused resource indices $v_{shift}$ as resource index candidates. In this example, since resource indices $v_{shift}=0$ and 2 are used for other eNBs, these are excluded and $\{1, 3, 4, 5\}$ are extracted as resource index candidates.

In ST207, resource index determining section 104 determines whether there is any unused $v_{shift}$ among resource index candidates, and the operation moves to ST208 when there is an unused $v_{shift}$, or moves to ST209 when there is no unused $v_{shift}$.

In ST208, resource index determining section 104 randomly selects one $v_{shift}$ from among unused $v_{shift}$'s. In this example, resource index $v_{shift3}=4$ is selected.

In ST209, resource index determining section 104 selects resource index $v_{shift}$ of an eNB installed at the farthest position from new eNB#3. In the example of FIG. 6C, $v_{shift3}=1$ is selected.

In ST210, resource index determining section 104 selects an invalid value (Null) as a cell ID of a neighboring eNB and in ST211, resource index determining section 104 selects an arbitrary $v_{shift}$.

In ST212, cell ID calculation section 105 calculates a cell ID of new eNB#3 from selected $v_{shift}$. In this example, cell ID=304 is selected according to equation 13.

However, in ST209, when resource index $v_{shift}$ of the eNB installed at the farthest position from the new eNB is selected, a cell ID different from the cell ID of the eNB installed at the farthest position is calculated.

In ST213, cell ID transmitting section 106 indicates cell ID=304 to new eNB#3.

Figure 1:
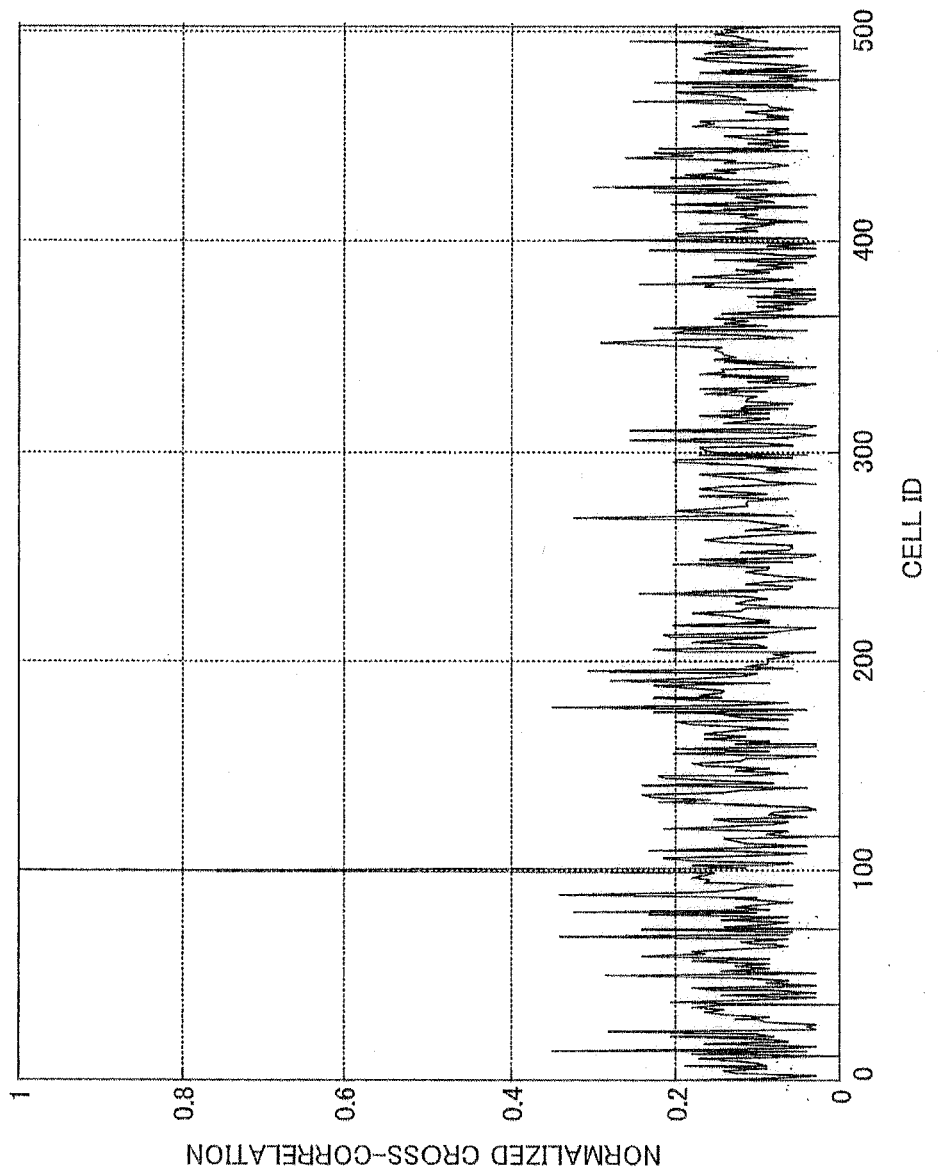
FIG. 1 illustrates a normalized cross-correlation of CRS sequences.
Figure 2C:
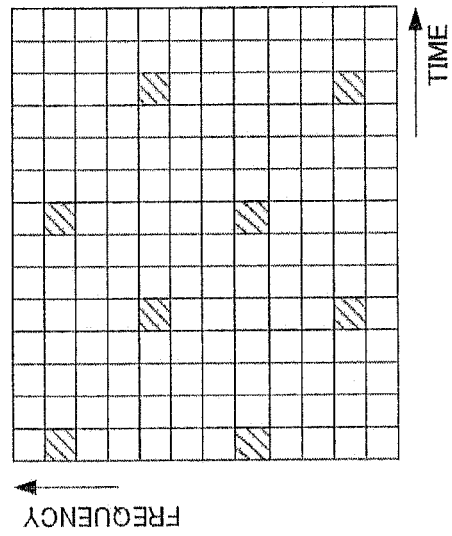
FIGS. 2A to 2C illustrate a CRS resource assignment in transmission units of LTE.
Figure 2B:
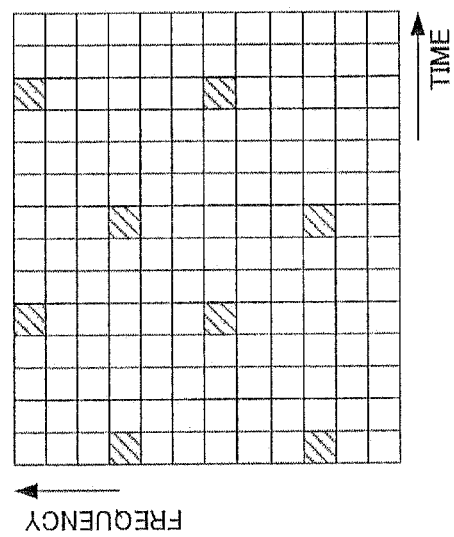
Figure 2A:
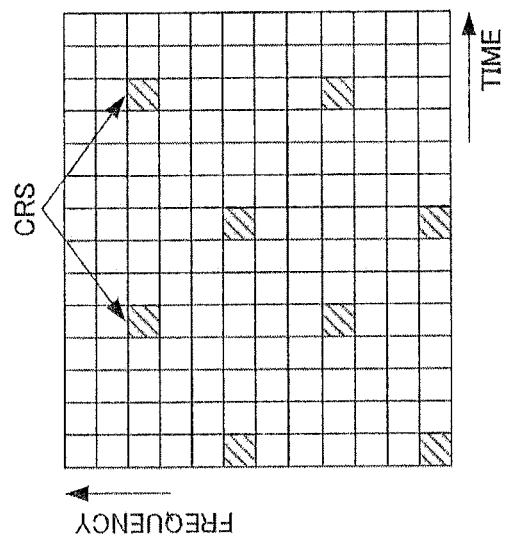
Figure 3:
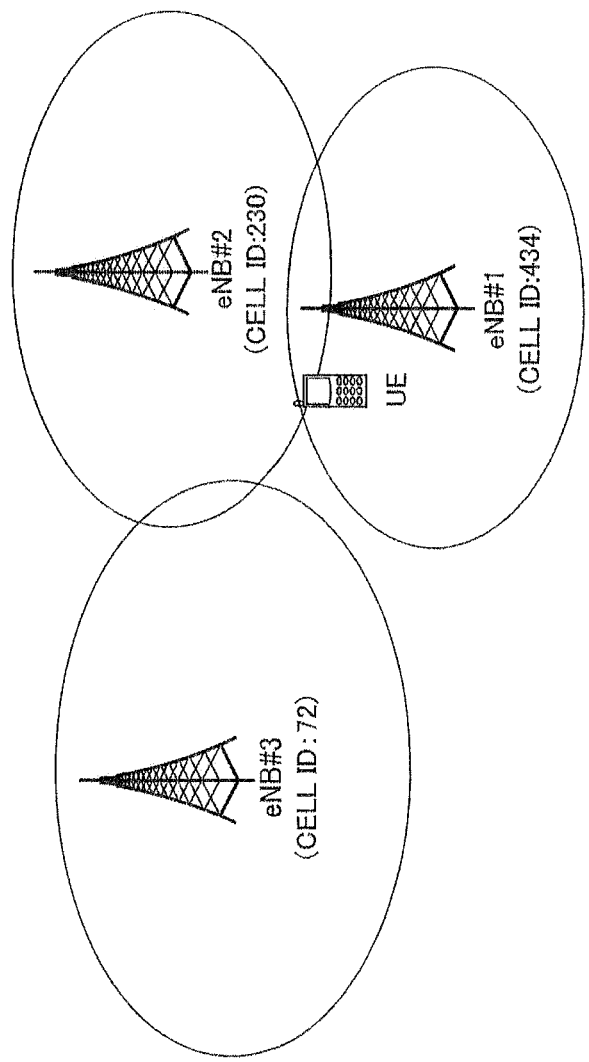
FIG. 3 is a diagram provided for describing a case where overlapping $v_{shift}$ occurs.

Using the method of determining a cell ID for the new eNB described above, CRSs of eNB#1 are assigned as shown in FIG. 2A, CRSs of eNB#2 are assigned as shown in FIG. 2B and CRSs of eNB#3 are assigned as shown in FIG. 2C. Accordingly, CRS resources are prevented from overlapping with each other between neighboring eNBs, and it is thereby possible to prevent CRSs from interfering between neighboring eNBs and thus to prevent deterioration of downlink throughput of each eNB.

Thus, according to Embodiment 1, the OAM that has received position information of a new eNB selects resource index $v_{shift}$ other than resource indices $v_{shift}$ used in eNBs neighboring to the new eNB, calculates a cell ID from selected resource index $v_{shift}$ and assigns the cell ID to the new eNB. This avoids resource indices $v_{shift}$ from overlapping with each other between neighboring eNBs including a new eNB and can also avoid overlapping of CRS resources uniquely determined from resource index $v_{shift}$. As a result, it is possible to avoid CRSs from interfering with each other between neighboring eNBs, to improve downlink throughput and to prevent erroneous cell selection by a UE.

Embodiment 2

In Embodiment 1, a case has been described where an OAM determines a cell ID of a new eNB. In Embodiment 2 of the present invention, a case will be described where a new eNB autonomously determines a cell ID of the new eNB.

Figure 8:
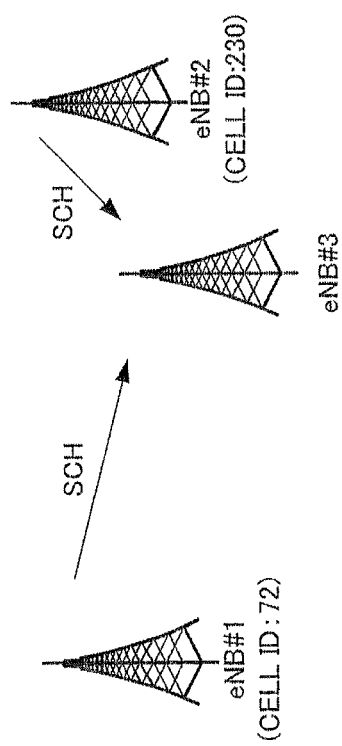
FIG. 8 illustrates a network system configuration according to Embodiment 2 of the present invention.

FIG. 8 illustrates a network system configuration according to Embodiment 2 of the present invention. In FIG. 8, an assumption is made that eNB#1 (cell ID=72) and eNB#2 (cell ID=230) are operated as an existing system and each eNB transmits an SCH (Synchronization Channel). The SCH includes the cell ID of the corresponding eNB. In this state, eNB#3 is newly installed.

Figure 9:
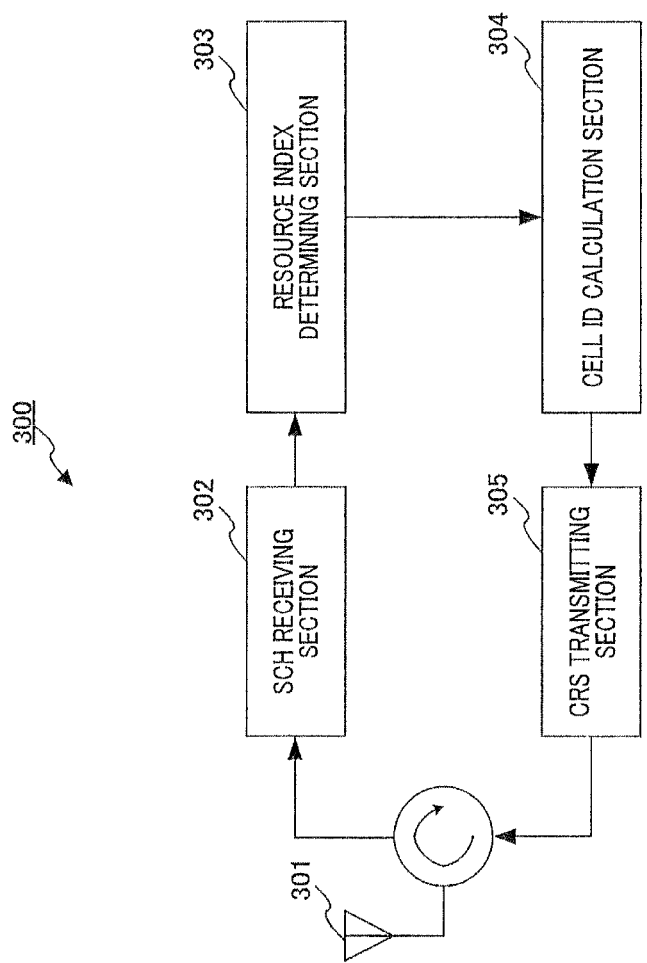
FIG. 9 is a block diagram illustrating a configuration of an eNB according to Embodiment 2 of the present invention.

FIG. 9 is a block diagram illustrating a configuration of eNB 300 according to Embodiment 2 of the present invention. In FIG. 9, when the eNB starts operation, SCH receiving section 302 receives an SCH transmitted from a neighboring eNB through antenna 301 and measures the reception level of the received SCH. For SCH whose reception level is equal to or higher than a threshold (e.g., −110 dBm), SCH receiving section 302 analyzes the cell ID thereof and outputs the cell ID together with the reception level to resource index determining section 303 as a valid cell ID. When there is no eNB whose reception level is equal to or higher than the threshold, SCH receiving section 302 outputs an invalid value (Null) to resource index determining section 303.

When one or more valid cell IDs are outputted from SCH receiving section 302, resource index determining section 303 initializes a resource index list as shown in FIG. 10A first. In this example, because the use of resource index $v_{shift}$ is indicated through input of the reception level, the resource index is initialized by resetting (erasing) the reception level inputted to the resource index list.

Next, resource index determining section 303 calculates resource index $v_{shift}$ of each neighboring eNB from valid cell IDs based on equation 7. Next, resource index determining section 303 inputs the reception level corresponding to resource index $v_{shift}$ used in the neighboring eNB to the resource index list (see FIG. 10B) and extracts unused resource indices $v_{shift}$ as resource index candidates. In this case, because resource indices $v_{shift}$=0 and 2 are used in other neighboring eNBs respectively, {1, 3, 4, 5} are extracted as resource index candidates.

Moreover, resource index determining section 303 selects arbitrary resource index $v_{shift}$ from among the resource index candidates and outputs selected resource index $v_{shift}$ to cell ID calculation section 304. In this case, let us suppose that resource index $v_{shift3}$=4 is selected. Consider a situation where many eNBs exist around the eNB, all resource indices $v_{shift}$ are thus already used, and there are no resource index candidates as shown in FIG. 10C. Resource index $v_{shift}$ of an eNB with an SCH having a lowest reception level (that is, resource index corresponding to a minimum reception level in the resource index list) is selected ($v_{shift3}$=3 is selected in the example of FIG. 10C). Upon reception of Null from SCH receiving section 302, resource index determining section 303 selects any resource index $v_{shift}$.

Cell ID calculation section 304 converts resource index $v_{shift}$ outputted from resource index determining section 303 to arbitrary cell ID according to equation 13, determines a cell ID of eNB 300, and outputs the determined cell ID to CRS transmitting section 305. However, when there is no resource index candidate and resource index $v_{shift}$ of an eNB of the lowest SCH reception level is selected, cell ID calculation section 304 calculates a cell ID different from the cell ID of the eNB of the lowest SCH reception level.

CRS transmitting section 305 generates a CRS sequence from the cell ID outputted from cell ID calculation section 304, performs predetermined frequency scheduling and then transmits the CRS sequence as a downlink signal via a circulator and antenna 301.

Next, the cell ID determining method in eNB 300 shown in FIG. 9 will be described using FIG. 11. In this case, let us consider a case where eNB#3 is newly installed while eNB#1 (cell ID=72) and eNB#2 (cell ID=230) are in operation as an existing system.

Figure 11:
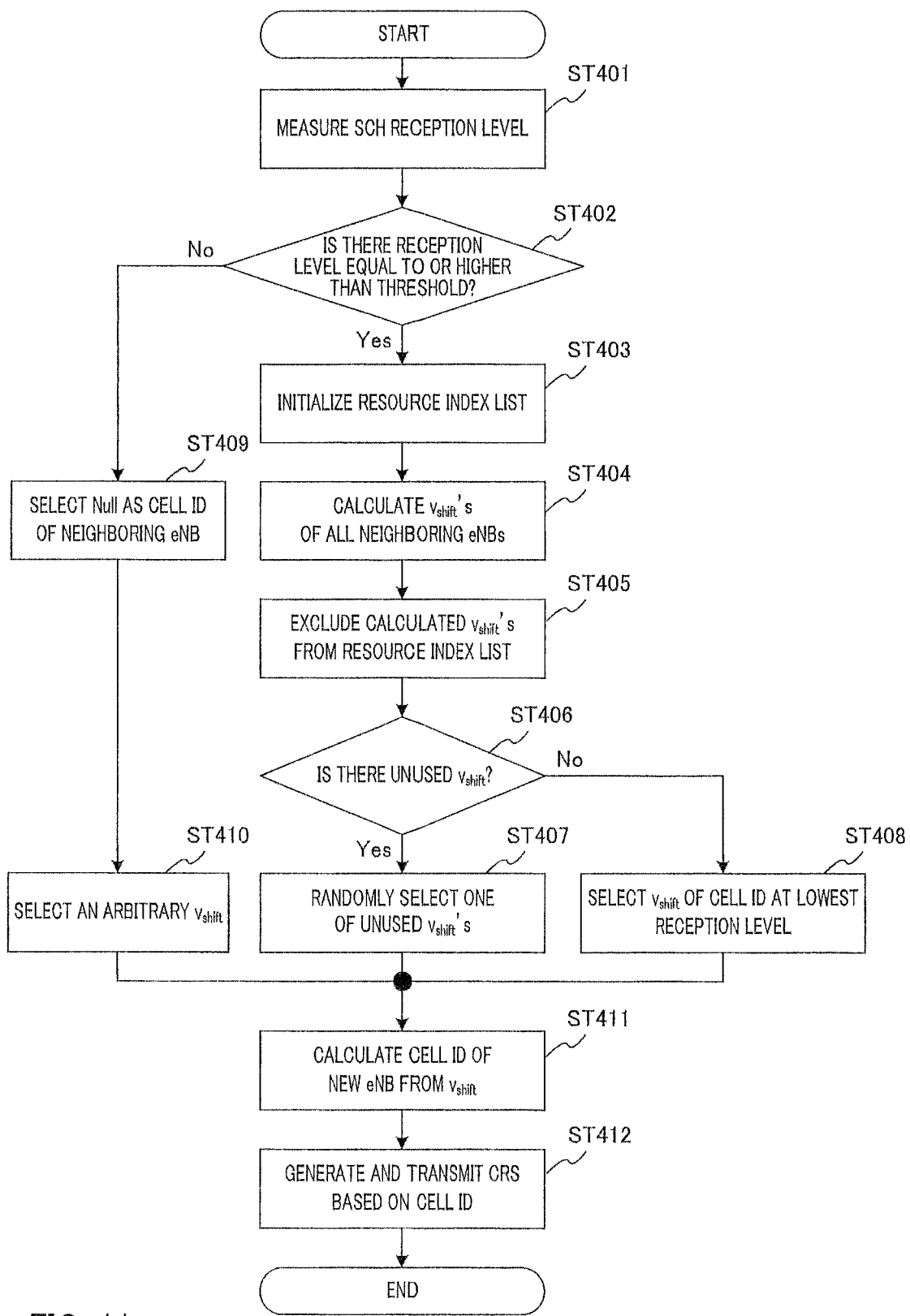
FIG. 11 is a flowchart illustrating a cell ID determining method in the eNB shown in FIG. 9.

In FIG. 11, in ST401, SCH receiving section 302 receives an SCH transmitted from a neighboring eNB, measures the reception level of the received SCH, and in ST402, SCH receiving section 302 determines the presence or absence of an SCH whose measured reception level is equal to or higher than a threshold (e.g., −110 dBm). The operation moves to ST403 when there is an SCH whose measured reception level is equal to or higher than the threshold or moves to ST409 when there is no SCH whose measured reception level is equal to or higher than the threshold.

In ST403, resource index determining section 303 initializes the resource index list as shown in FIG. 10A, and in ST404, resource index determining section 303 calculates resource index $v_{shift}$ of a neighboring eNB from a valid cell ID based on equation 7. In the case of the example shown in FIG. 8, resource index $v_{shift1}$ of eNB#1=0 and resource index $v_{shift2}$ of eNB#2=2 are obtained.

In ST405, resource index determining section 303 inputs, to the resource index list, resource index $v_{shift}$ calculated in ST404, that is, the reception level corresponding to resource index $v_{shift}$ used in each neighboring eNB (see FIG. 10B) and extracts unused resource index $v_{shift}$ as a resource index candidate. In this case, since resource indices $v_{shift}$=0 and 2 are used in other neighboring eNBs, respectively, these resource indices are excluded and {1, 3, 4, 5} are extracted as resource index candidates.

In ST406, resource index determining section 303 determines whether there is any unused $v_{shift}$ among the resource index candidates, and the operation moves to ST407 when there is unused $v_{shift}$, or moves to ST408 when there is no unused $v_{shift}$.

In ST407, resource index determining section 303 randomly selects one $v_{shift}$ from among unused $v_{shift}$'s. In this example, resource index $v_{shift3}$=4 is selected.

In ST408, resource index determining section 303 selects a resource index of eNB corresponding to an SCH having the lowest reception level. In the example in FIG. 10C, $v_{shift3}$=3 is selected.

In ST409, resource index determining section 303 selects an invalid value (Null) as a cell ID of a neighboring eNB, and in ST410, resource index determining section 303 selects an arbitrary $v_{shift}$.

In ST411, cell ID calculation section 304 calculates a cell ID of eNB 300. Here, suppose that cell ID=304 is calculated according to equation 13. However, in ST408, when resource index $v_{shift}$ of an eNB whose SCH reception level is lowest is selected, a cell ID different from the cell ID) of an eNB whose SCH reception level is lowest is calculated.

In ST412, CRS transmitting section 305 generates a CRS sequence according to the calculated cell ID and transmits the CRS sequence as a downlink signal.

Using the above-described method of determining a cell ID of a new eNB, CRSs of eNB#1 are assigned as shown in FIG. 2A, CRSs of eNB#2 are assigned as shown in FIG. 2B and CRSs of eNB#3 are assigned as shown in FIG. 2C. Therefore, CRS resources do not overlap with each other between neighboring eNBs, so that it is possible to prevent CRSs from interfering with each other between neighboring eNBs and thus to prevent deterioration of downlink throughput of each eNB.

Thus, according to Embodiment 2, resource index $v_{shift}$ other than resource index $v_{shift}$ used by neighboring eNBs is selected for a new eNB, a cell ID is calculated from selected resource index $v_{shift}$ and assigned to the new eNB. Accordingly, overlapping of resource indices $v_{shift}$ between a new eNB and neighboring eNBs are avoided, and overlapping of CRS resources uniquely determined from resource index $v_{shift}$ can be avoided. As a result, it is possible to prevent CRSs from interfering with each other between neighboring eNBs, improve downlink throughput and to prevent erroneous cell selection by a UE.

Although the present embodiment has been described assuming that a new eNB receives an SCH transmitted from a neighboring eNB and acquires a cell ID, the present invention is not limited to this, and the cell ID of the neighboring eNB may be reported from a UE in the cell of the new eNB. Alternatively, the cell ID of the neighboring eNB may also be directly acquired from the neighboring eNB using the X2 interface.

In this embodiment, a case has been described where no limitation is placed on settable cell IDs, but a new eNB may acquire a list of settable cell IDs from an OAM (not shown) in advance and select a cell ID from the list.

Embodiment 3

Generally, when an eNB performs MIMO transmission on downlink, it is preferable for UEs to receive pilot signals transmitted from each antenna with a low fading correlation and with high quality in order to enhance spatial isolation performance. For this reason, pilot signals for each antenna are generally assigned in such a manner as to avoid time and frequency resources from overlapping with each other.

Figure 12B:
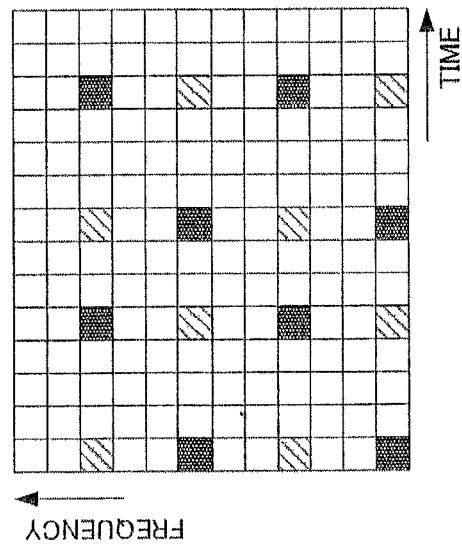
FIGS. 12A and 12B illustrate a CRS assignment when downlink MIMO transmission is performed.
Figure 12A:
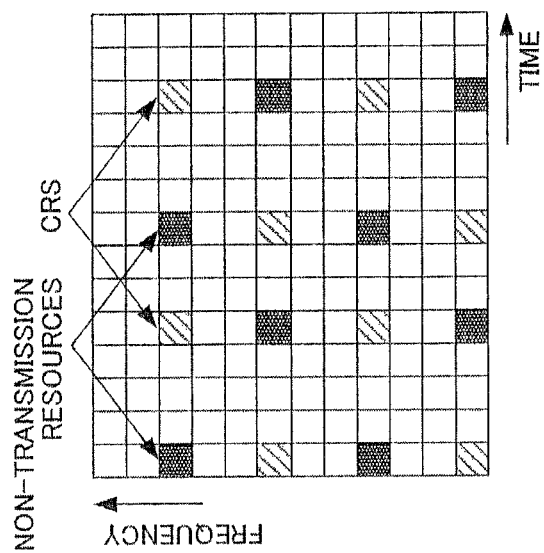

FIGS. 12A and 12B show a CRS assignment when an eNB performs downlink MIMO transmission (spatial multiplex number=2, $v_{shift}$=0) in LTE. In FIG. 12, shaded blocks indicate positions at which CRSs are assigned and filled-in blocks indicate non-transmission resources (resources where transmission is stopped); FIG. 12A shows an assignment of CRS resources transmitted from antenna port 0 and FIG. 12B shows an assignment of CRS resources transmitted from antenna port 1. In LTE, CRSs for each transmitting antenna are frequency-divided and CRS resources of paired antennas are not transmitted to secure receiving quality of CRSs transmitted from each antenna.

However, in other words, two resource indices $v_{shift}$ are used for one cell ID (that is, one eNB). In the case of FIGS. 12A and 12B, a resource index of $v_{shift}$=3 is also used in addition to $v_{shift}$=0 for CRSs of the eNB. Therefore, when an eNB is newly installed, it is desirable to determine a cell ID in consideration of not only a cell ID of a neighboring eNB but also the presence or absence of MIMO transmission thereof.

A case will be described in Embodiment 3 of the present invention where an OAM determines a cell ID of newly installed eNB#3 on the premise of the system configuration of Embodiment 1 (FIG. 4). In this case, an assumption is made that pre-installed eNB#1 and eNB#2 are performing MIMO transmission with a maximum spatial multiplex number of 2.

Since an OAM configuration according to Embodiment 3 of the present invention is similar to the configuration shown in FIG. 5 of Embodiment 1, the OAM configuration will be described with reference to FIG. 5.

Figure 13:
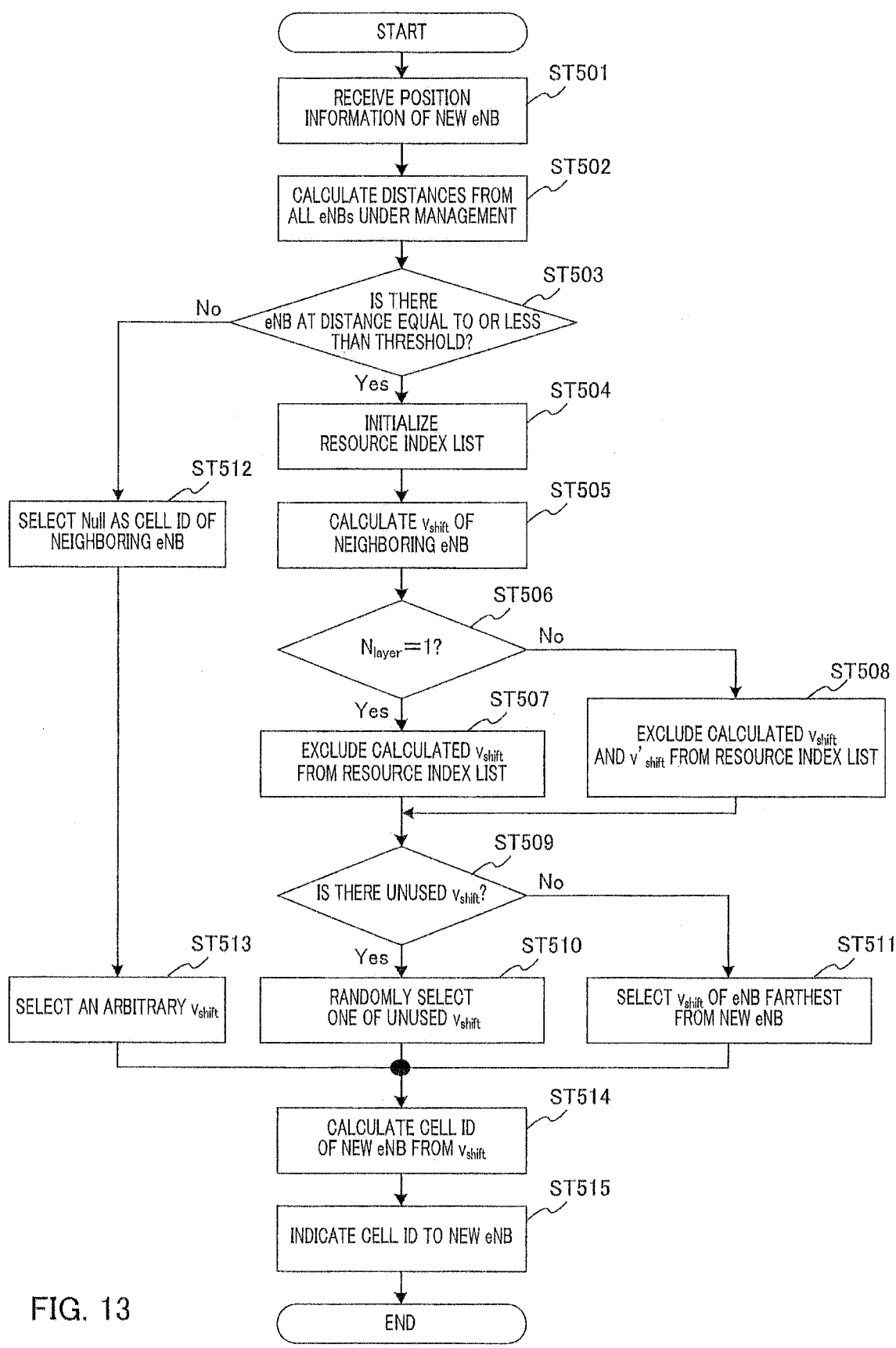
FIG. 13 is a flowchart illustrating a cell ID determining method according to Embodiment 3 of the present invention.

FIG. 13 is a flowchart illustrating a cell ID determining method according to Embodiment 3 of the present invention. In FIG. 13, in ST501, position information receiving section 101 receives position information of newly installed eNB#3 from eNB#3, and in ST502, distance calculation section 103 calculates a distance D [m] between newly installed eNB#3 and another eNB using position information of all eNBs under the control of the OAM acquired from base station information management section 102 and position information of eNB#3 according to equation 10.

In ST503, distance calculation section 103 determines the presence or absence of an eNBs whose calculated distance is equal to or less than a threshold (e.g., 500 [m]), and the operation moves to ST504 when there is an eNB whose calculated distance is equal to or less than the threshold, or moves to ST512 when there is no eNB whose calculated distance equal to or less than the threshold.

In ST504, cell IDs of all eNBs whose distance from eNB#3 is equal to or less than a threshold and information on the distance from eNB#3 are outputted to resource index determining section 104. An assignable maximum spatial multiplex number ($N_{layer}$) of all eNBs whose distance from eNB#3 is equal to or less than the threshold acquired from base station information management section 102 is outputted to resource index determining section 104. Resource index determining section 104 initializes a resource index list (see FIG. 14A). Here, cell ID=72 of eNB#, distance D1=320 and $N_{layer1}$=2, and cell ID=230 of eNB#2, distance D2=374 and $N_{layer2}$=2 are outputted to resource index determining section 104.

In ST505, resource index determining section 104 calculates resource index $v_{if}$ of a neighboring eNB from a valid cell ID based on equation 7. In the case of the example shown in FIG. 4, resource index $v_{shift1}$ of eNB#1=0, and resource index $v_{shift2}$ of eNB#2=2 are obtained.

In ST506, resource index determining section 104 checks $N_{layer}$ of a neighboring eNB, determines whether or not $N_{layer}$=1, and the operation moves to ST507 when $N_{layer}$=1 or moves to ST508 when $N_{layer}$≠1.

In ST507, resource index determining section 104 inputs, to the resource index list, resource index $v_{shift}$ calculated in ST505, that is, a distance corresponding to resource index $v_{shift}$ used in the neighboring eNB, removes the distance and extracts resource index candidates. In this case ($N_{layer}$=1), transmission is performed via a single antenna.

In ST508, resource index determining section 104 inputs, to the resource index list, a distance corresponding to resource index $v'_{shift}$ calculated from following equation 14 in addition to resource index $v_{shift}$ used in the eNB, removes the distance and extracts resource index candidates. In this case ($N_{layer}$≠1), MIMO transmission is performed.

[14]

$$v'_{shift}=(v_{shift}+3) \bmod 6 \quad \text{(Equation 14)}$$

In the present embodiment, since both eNB#1 and eNB#2 are performing MIMO transmission with a maximum spatial multiplex number of 2, $v'_{shift1}$=3 and $v'_{shift2}$=5 are obtained according to equation 14. As a result of inputting them to the resource index list, only 1 and 4 remain as resource index candidates as shown in FIG. 14B.

In ST509, resource index determining section 104 determines whether there is any unused $v_{shift}$ among resource index candidates, and the operation moves to ST510 when there is any unused $v_{shift}$, or moves to ST511 when there is no unused $v_{shift}$.

In ST510, resource index determining section 104 randomly selects $v_{shift}$ from among unused $v_{shift}$'s. Here, let us suppose that resource index $v_{shift3}$=1 is selected.

In ST511, resource index determining section 104 selects resource index $v_{shift}$ of an eNB installed at the farthest position from new eNB#3. In an example of FIG. 14C, $v_{shift1}$=1 or 4 is selected.

In ST512, resource index determining section 104 selects an invalid value (Null) as a cell ID of a neighboring eNB and in ST513, resource index determining section 104 selects an arbitrary $v_{shift}$.

In ST514, cell ID calculation section 105 calculates a cell ID of new eNB#3 from selected $v_{shift}$. In this example, cell ID=37 is selected according to equation 13.

However, in ST511, when resource index $v_{shift}$ of the eNB installed at the farthest position from the new eNB is selected, a cell ID different from the cell ID of the eNB installed at the farthest position is calculated.

In ST515, cell ID transmitting section 106 indicates cell ID=37 to new eNB#3.

Figures 15A, 15B, 15C:
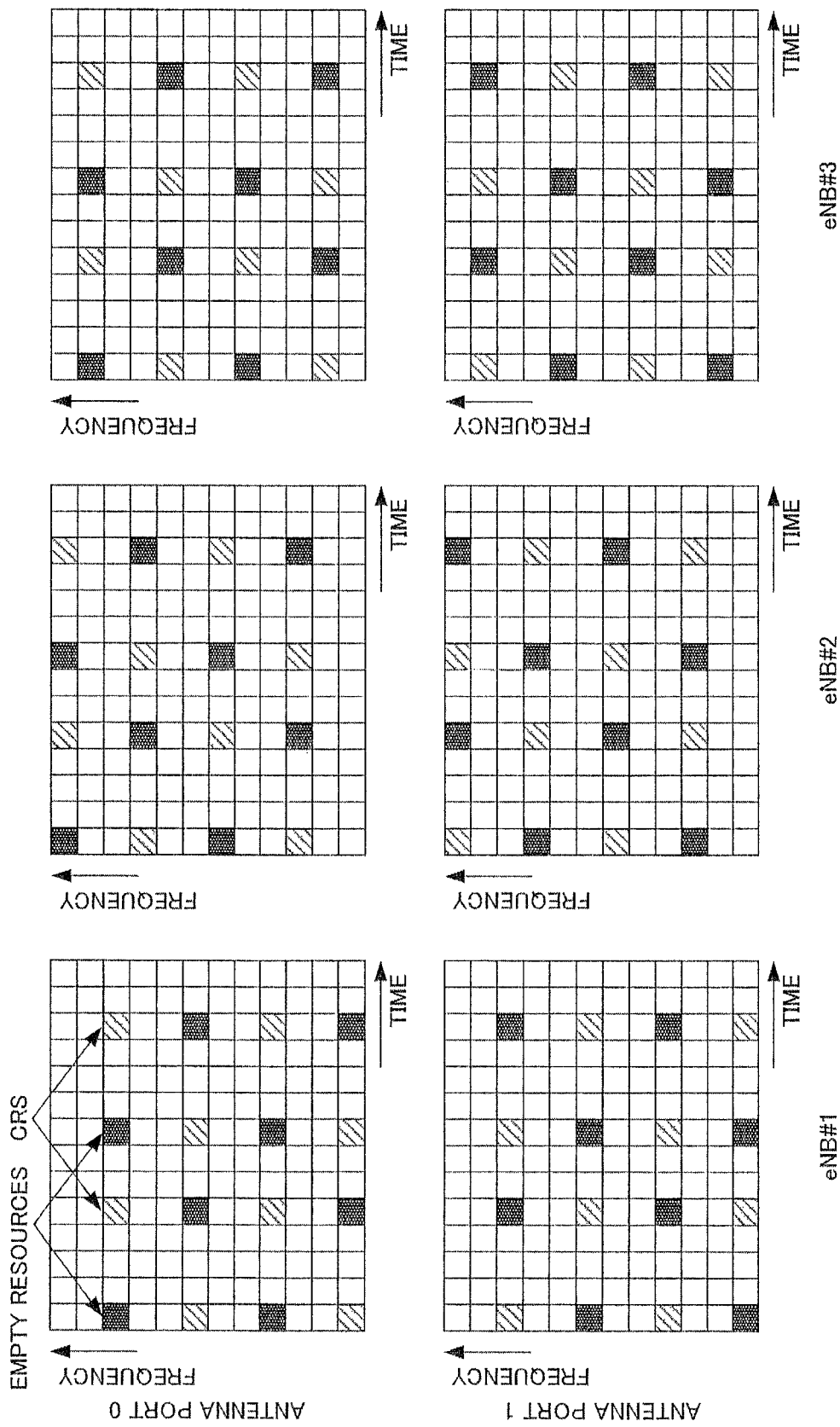
FIGS. 15A, 15B, and 15C illustrate an assignment of CRS resources allocated for each antenna port of eNBs #1 to 3.

Using the method of determining a cell ID for a new eNB that performs MIMO transmission described above, CRSs of eNB#1 are assigned in the manner shown in FIG. 15A, CRSs of eNB#2 are assigned as shown in FIG. 15B and CRSs of eNB#3 are assigned as shown in FIG. 15C. Therefore, CRS resources transmitted from respective antennas of neighboring eNBs do not overlap with each other, and it is thereby possible to avoid CRSs from interfering with each other and thus to prevent deterioration of downlink throughput of each eNB.

Thus, according to Embodiment 3, the OAM that has received position information of a new eNB selects resource indices $v_{shift}$ other than resource indices $v_{shift}$ and $v'_{shift}$ assigned to the respective antenna ports in accordance with a maximum spatial multiplex number of neighboring eNBs and, calculates a cell ID from selected resource index $v_{shift}$ and assigns the cell ID to the new eNB. Accordingly, overlapping of resource indices $v_{shift}$ between neighboring eNBs including the new eNB are avoided and overlapping of CRS resources uniquely determined from resource index $v_{shift}$ can be avoided. As a result, it is possible to avoid CRSs from interfering with each other between neighboring eNBs that perform MIMO transmission, to improve downlink throughput and to prevent erroneous cell selection by a UE.

The cell ID determining method in consideration of a maximum spatial multiplex number of neighboring eNBs in the present embodiment is also applicable to Embodiment 2.

The disclosure of Japanese Patent Application No. 2011-285667, filed on Dec. 27, 2011, including the specification, drawings and abstract is incorporated herein by reference in its entirety.

INDUSTRIAL APPLICABILITY

The server apparatus, base station apparatus and identification number determining method according to the present invention are applicable to an LTE-based mobile communication system, for example.

REFERENCE SIGNS LIST

101 Position information receiving section
102 Base station information management section
103 Distance calculation section
104, 303 Resource index determining section
105, 304 Cell ID calculation section
106 Cell ID transmitting section
301 Antenna
302 SCH receiving section
305 CRS transmitting section

The invention claimed is:

1. A server apparatus that manages an identification number of a base station, the server apparatus comprising:
a determining section that determines, based on an identification number of a neighboring base station around a newly installed new base station, a frequency assignment for reference signals different from a frequency assignment for reference signals transmitted by the neighboring base station;
an identification number calculation section that calculates an identification number of the new base station based on the determined frequency assignment; and
a transmitting section that transmits the calculated identification number to the new base station.

2. The server apparatus according to claim 1, further comprising a receiving section that receives position information indicating an installation position of the new base station from the new base station, wherein
the determining section calculates a distance between the new base station and the neighboring base station based on the position information of the new base station and position information of the neighboring base station and determines a frequency assignment for reference signals different from a frequency assignment for reference signals transmitted by a neighboring base station whose distance to the new base station is equal to or less than a predetermined threshold.

3. The server apparatus according to claim 2, wherein:
the determining section determines a frequency assignment for reference signals transmitted by the neighboring base station located farthest from the new base station; and
the identification number calculation section calculates an identification number different from an identification number of the neighboring base station located farthest from the new base station based on the determined frequency assignment.

4. The server apparatus according to claim 1, wherein
the determining section sets a frequency assignment for reference signals for the new base station, the frequency assignment being different from a frequency assignment for reference signals in accordance with a maximum spatial multiplex number of the neighboring base station.

5. A base station apparatus comprising:
a receiving section that receives from a neighboring base station an identification number of the neighboring base station;
a determining section that determines a frequency assignment for reference signals different from a frequency assignment for reference signals transmitted by the neighboring base station, based on the identification number of the neighboring base station; and
an identification number calculation section that calculates an identification number of the base station based on the determined frequency assignment.

6. The base station apparatus according to claim 5, wherein:
the receiving section measures a reception level of a signal transmitted from the neighboring base station; and
the determining section determines a frequency assignment for reference signals different from a frequency assignment for reference signals transmitted by the neighboring base station whose measured reception level is equal to or higher than a predetermined threshold.

7. The base station apparatus according to claim 6, wherein:
the determining section determines a frequency assignment for reference signals transmitted by the neighboring base station whose measured reception level is lowest; and the identification number calculation section calculates an identification number of the base station apparatus different from an identification number of the neighboring base station whose reception level is lowest, based on the determined frequency assignment.

8. The base station apparatus according to claim 5, wherein the determining section determines a frequency assignment for reference signals for each antenna port of the base station apparatus, the frequency assignment being different from a frequency assignment for-reference signals in accordance with a maximum spatial multiplex number of the neighboring base station.

9. An identification number determining method comprising:
   determining, based on an identification number of a neighboring base station around a newly installed new base station, a frequency assignment for reference signals different from a frequency assignment for reference signals transmitted by the neighboring base station; and
   calculating an identification number of the new base station based on the determined frequency assignment.

* * * * *